United States Patent [19]

Adahan

[11] 4,046,214

[45] Sept. 6, 1977

[54] BRAKE PRESSURE MODULATOR AND SYSTEM

[75] Inventor: Carmeli Adahan, Berkeley, Calif.

[73] Assignee: Aspro, Inc., Westport, Conn.

[21] Appl. No.: 713,799

[22] Filed: Aug. 13, 1976

[51] Int. Cl.² ............................................. B60T 8/02
[52] U.S. Cl. ..................................... 180/109; 303/93;
303/116; 303/119
[58] Field of Search ................... 303/93, 98, 100, 102,
303/103, 116, 61, 119, 115, 113, 96, 95, 20;
188/181 A, 181 C; 317/19; 180/82 R, 103, 105
R, 105 E, 109, 108, 77 R; 251/30

[56] References Cited

U.S. PATENT DOCUMENTS

| 3,288,232 | 11/1966 | Shepherd | 303/96 X |
| 3,771,839 | 11/1973 | Fink | 303/119 X |
| 3,847,449 | 11/1974 | Adahan | 303/116 |
| 3,901,559 | 8/1975 | Inada | 303/61 X |

*Primary Examiner*—Trygve M. Blix
*Assistant Examiner*—Douglas C. Butler

*Attorney, Agent, or Firm*—Lawrence E. Laubscher

[57] ABSTRACT

A modulating pump is disclosed including a pumping member that is initially operable by a solenoid device in a relatively long full-stroke condition to effect rapid pressure build-up of the fluid supplied to a load, the pumping member being subsequently operated by the solenoid device in a relatively short stroke condition to effect further pressure build-up in the load. A main spring device normally biases the armature of the main solenoid device to achieve the full-stroke operating condition, and when the pressure of the load reaches a value to cause the return force of the main spring to be overcome, a resilient abutment device becomes operable to achieve the desired short stroke pumping condition. A self commutating pump device is also disclosed. The modulating pump device is included in a vehicle traction control system, as, for example, an anti-skid traction control system for automatically braking an overrunning driven wheel relative to another driven wheel connected thereto by a differential mechanism.

34 Claims, 9 Drawing Figures

BRAKE PRESSURE MODULATOR AND SYSTEM

BRIEF DESCRIPTION OF THE PRIOR ART

In the prior Adahan U.S. Pat. No. 3,847,449, a solenoid-powered brake pressure modulator is disclosed for use in a hydraulic brake system of the anti-skid (anti-wheel-lock) type. In this system, pulses are supplied to the solenoid to effect reciprocation of a pumping member to pump fluid from the reservoir of the master brake cylinder to the wheel brake cylinder of the vehicle to brake the associated wheel.

It is also known in the prior art — as evidenced by the patents to Eger et al. U.S. Pat. No. 3,025,722, Mikina U.S. Pat. No. 3,253,672 and Shepherd U.S. Pat. Nos. 3,169,595 and 3,238,232, and the patent to William C. Eddy U.S. Pat. No. 3,981,545 to provide traction control systems including means for automatically braking at least one driven wheel when it overruns by a predetermined amount another driven wheel connected thereto by a differential mechanism.

SUMMARY OF THE INVENTION

The present invention was directed to the development of an improved inexpensive high-pressure apparatus and to an improved traction control system incorporating the same.

Accordingly, a primary object of the invention is to provide improved pumping apparatus including a solenoid-operated pumping member which is initially reciprocated in a relatively long full-stroke pumping condition to effect rapid build-up of fluid pressure in a load, and is subsequently operated in a relatively short stroke pumping operation to effect relatively slow additional pressure buildup of the load. In accordance with a characterizing feature of the invention, use is made of resilient abutment means for providing the short stroke pumping operation after the return force of the main solenoid spring is overcome by the back pressure of the fluid at the load. The resilient abutment means may comprise an O-ring carried by the armature of the main solenoid means, or a stationary O-ring mounted on either the stator of the main solenoid or on the valve body.

According to another object of the invention, at least two of the pumping devices are connected in a traction control system for automatically modulating the fluid applied to the wheel cylinders associated with a plurality of wheels. In certain embodiments of the invention, the pumping means include separate valve bodies and separate main solenoids, while, in other embodiments, the pumping devices include a common valve body and either separate or common main solenoid means.

According to a more specific object of the invention, a traction control system of the anti-span type is provided for selectively operating the brakes associated with a pair of driven wheels that are connected by a differential mechanism to automatically correct an overrunning condition in which one driven wheel overruns the other by a predetermined value. Wheel speed sensing means are provided which operate pulse generator means to supply pulses to the main solenoid means and for simultaneously supplying power to auxiliary by-pass solenoid means which continuously close by-pass passage means associated with the faster running wheel. Thus, in the anti-spin braking system, the faster wheel is automatically braked to effect the transfer of driving torque to the other driven wheel via the differential.

According to another object of the invention, the modulating pump means may be so connected in an existing braking system as to constitute an electrically operable emergency braking system in the event of failure of the primary fluid pressure braking system including a master cylinder.

A further object of the invention is to provide self-commutating modulating pump means wherein the armature member operates switch means to de-energize the main solenoid means when the armature is in a retracted end position against the biasing force of the main spring means.

BRIEF DESCRIPTION OF THE DRAWINGS

Other objects and advantages of the invention will become apparent from a study of the following specification when viewed in the light of the accompanying drawing, in which:

FIG. 9 is a detailed view of a second embodiment of the resilient abutment means.

DETAILED DESCRIPTION

Figure 1:
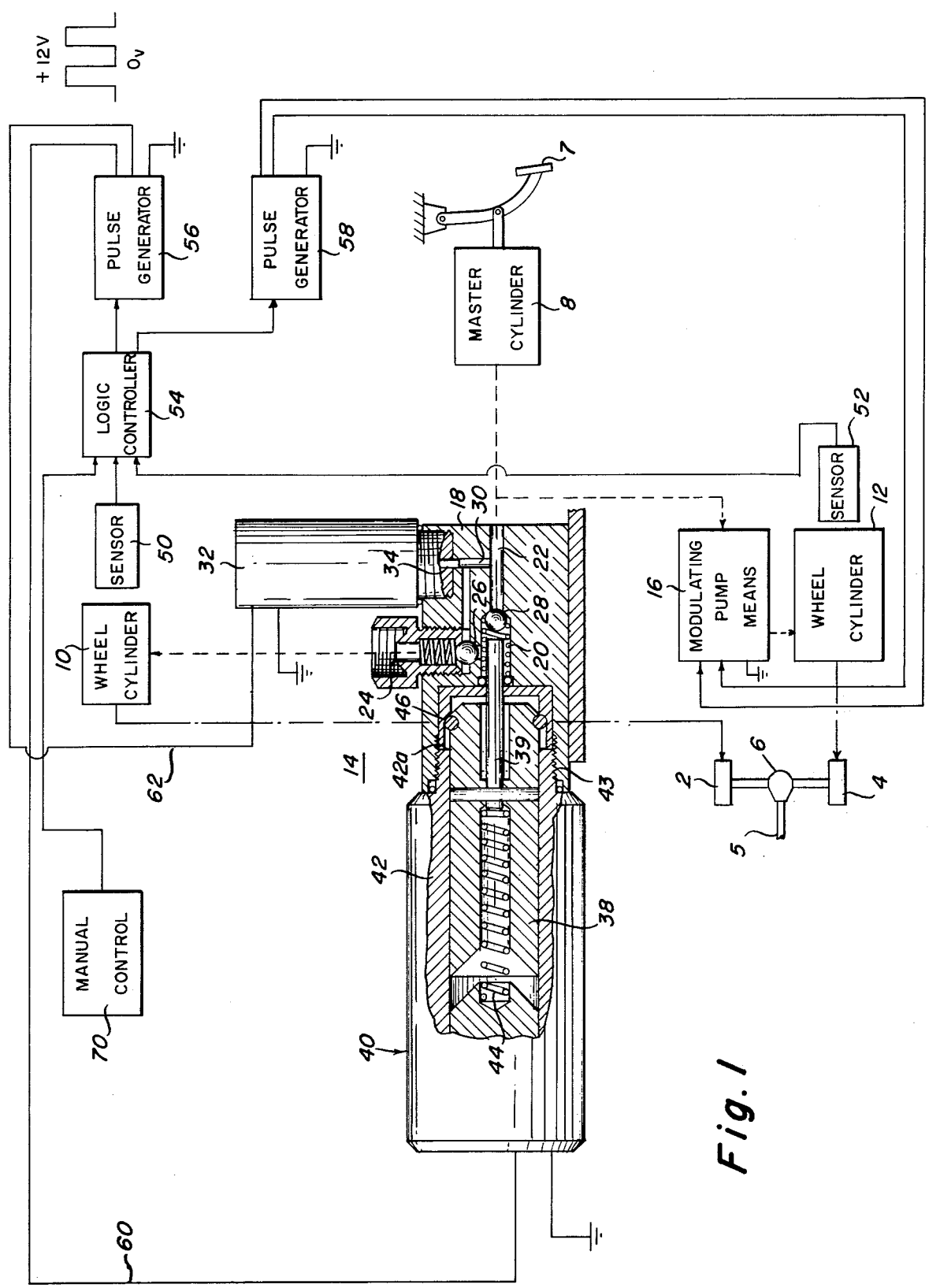
FIG. 1 is a partially diagrammatic electrical schematic diagram illustrating a traction control system including a first modulator embodiment of the invention.

Referring first more particularly to FIG. 1, the traction control system of the present invention is adapted for use with a motor vehicle including a pair of driven wheels 2 and 4 that are connected by a conventional differential mechanism 6. Master brake cylinder 8 is provided for supplying pressure fluid to the wheel brake cylinders 10 and 12 that are associated with the driven wheels 2 and 4, respectively. In accordance with the present invention, brake pressure modulating pump means 14 and 16 are connected between the master cylinder 8 and each of the wheel cylinders 10 and 12, respectively. Each of the modulating pump means includes a valve body 18 which contains a pumping chamber 20, an inlet port 22 that is connected with the master cylinder and which communicates with the pumping chamber 20, and an outlet port 24 which is connected with the wheel cylinder 10 and which also communicates with the pumping chamber 20. A first check valve 26 normally isolates the outlet port 24 from the pumping chamber 20, and a second check valve 28 normally isolates the pumping chamber 20 from the inlet port 22. A by-pass passage 30 is provided which connects the inlet port 22 with the outlet port 24 in by-passing relation to the pumping chamber 20. Normally de-energized auxiliary solenoid means 32 are provided which include an armature pin member 34 that is adapted to close the by-pass passage 30 when the auxiliary solenoid 32 is energized.

Extending at one end into the pumping chamber 20 is a pumping member 39 the other end of which is connected with the movable armature 38 of solenoid means 40. The stator 42 of the armature means 40 is rigidly connected with the valve body 18 (for example, by a screw thread connection 43). The solenoid means 40 also includes a mainspring member 44 which biases the armature 38 to the right toward the end position illustrated in FIG. 1. In accordance with the present invention, there is mounted in a peripheral groove contained in the free end of the armature 38 adjacent the valve body 18 a resilient O-ring 46. Consequently, when the solenoid means 40 is energized, the armature 38 is shifted to the left against the biasing force of the main spring 44 to a second end position in which the O-ring 46 engages a stationary abutment 42a defined by the right hand extremity of the stationary stator 42.

Associated with each of the driven wheels 2 and 4 are speed sensing means 50 and 52 which sense the rotational velocities of the associated wheels, respectively. These speed sensing means may be of any conventional type, as for example, a variable reluctance magnetic sensor. These sensing means transmit signal voltages to the logic controller 54 which in turn controls the operation of a pair of pulse generator means 56 and 58 that are associated with the driven wheels 2 and 4, respectively. The pulse generator 56 is operable to transmit uniform 12-volt pulses to the coil of solenoid means 40, via conductor 60, thereby to effect alternate energization and de-energization of the solenoid means 40. Similarly, the coil of auxiliary solenoid 32 is energized by pulse generator 56 via conductor 62, whereby the auxiliary solenoid 32 is continuously energized when pulse generator 56 is activated. The structure and operation of the modulating pump means 16 are identical to that of the modulating pump means 14. Manual control means 70 are connected with the logic controller 54 to simultaneously operate both pulse generators 56 and 58 as will be described below.

Figure 2:
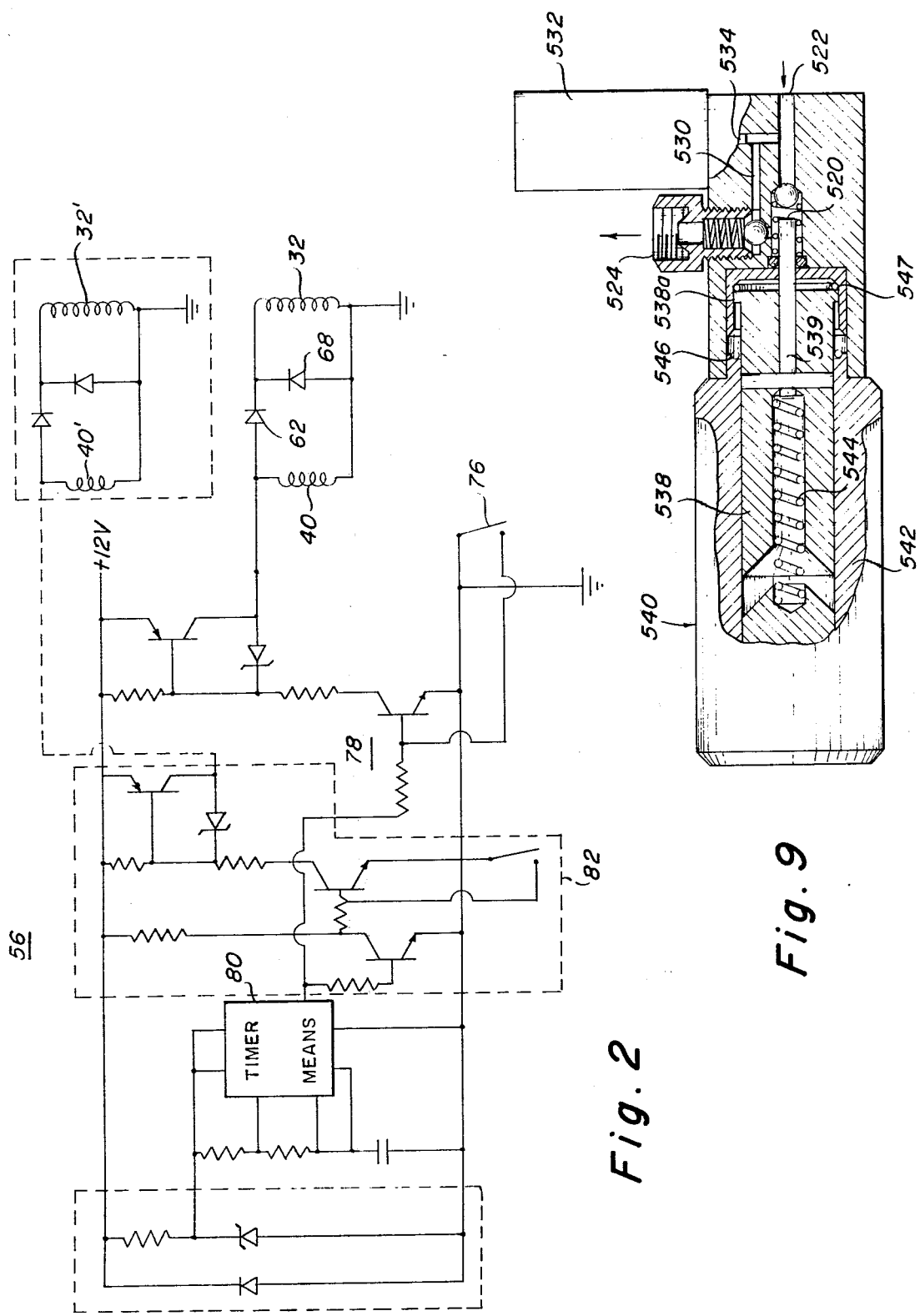
FIGS. 2 and 3 are electrical schematic diagrams of the pluse generator and logic controller means of FIG. 1, respectively.

Referring now to FIG. 2, the pulse generator means 56 is illustrated for transmitting 12-volt pulses to the solenoid coil 40, and for supplying a rectified 12-volt potential to the auxiliary solenoid means 32. The timer circuit is actuated upon opening of switch 76 to cause output transistor 78 to be rendered conductive and nonconductive, respectively, as controlled by the timer means 80. In the event that the system were to be utilized with a motor vehicle having a tandem wheel system, the intermediate circuit 82 might be provided for supplying 12-volt pulses to the solenoid means 40' and 32' associated with the other tandem wheel. Preferably the solenoids 32 and 32' are energized and de-energized 180° out of phase, respectively, thereby to effect less loading on the power lines. The details of the specific pulse generator means are not critical to this invention, since various types of pulse generating means could be used equally as well.

Figure 3:
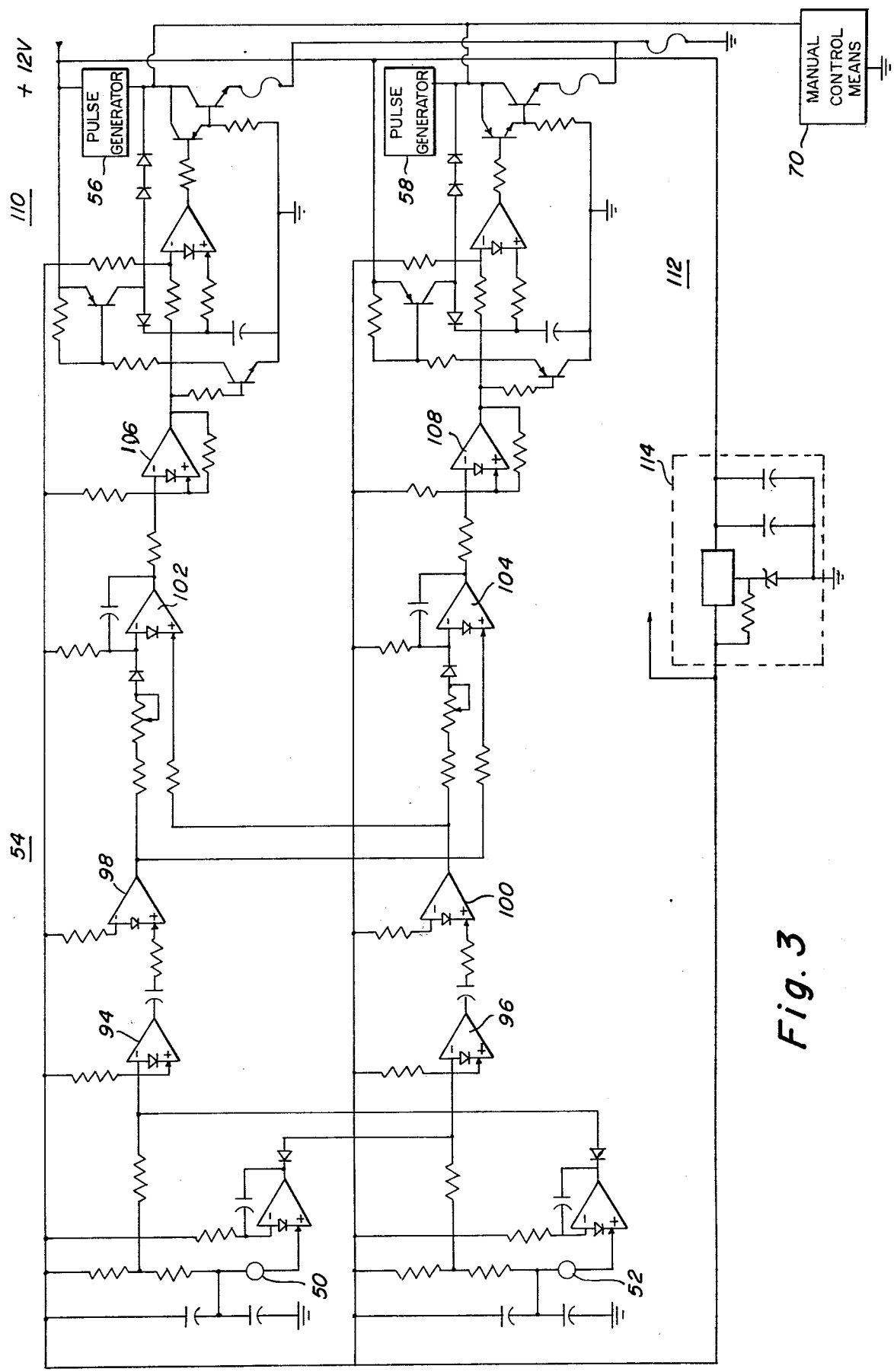

The nature of the logic control or comparison circuit means included in the traction control system depends, of course, on the specific nature of the wheel velocity sensing means 50 and 52. Referring now to FIG. 3, one embodiment of the comparison circuit means is disclosed which is adpated for use with velocity sensing means 50 and 52 of the magnetic pick-up type. As shown in FIG. 3, the vehicle speed sensing devices 50 and 52 generate sine wave signal voltages that are supplied to the inputs of squarer amplifiers 94 and 96 which convert the sine waves to square waves. The signal voltages then pass through pulse shaping aplifiers 98 and 100 that produce pulses of equal width, the number of the pulses corresponding with the rotational velocities of the respective driven wheels. The output terminal of each pulse shaping amplifier is connected to the input terminals of a pair of integrating amplifiers 102 and 104 that are part of a differential circuit which sets the wheel speed differential. The rising direct-current signals from the integrating amplifiers are fed to the input terminals of a pair of comparators with hysteresis 106 and 108, respecively. Each of the comparators serves as a voltage level sensing means for actuating the associated output stage 110 and 112 when the predetermined differential value is exceeded, thereby to activate the corresponding pulse generator means 56 and 58, respectively. The regulated voltage power supply 114 supplies +12 volt power to the comparison circuit.

OPERATION

In operation, assume that the vehicle is traveling under normal conditions and the foot-operated brake lever is actuated to operate master cylinder 8. Pressure fluid is then supplied to wheel cylinder 10 via inlet port 22, by-pass passage 30, check valve 26, and outlet port 24. Similarly, pressure fluid is simultaneously supplied to wheel cylinder 12 via modulating pump means 16, whereupon both driven wheels 2 and 4 are braked simultaneously.

Assume now that the driven wheel 2 rotates at an appreciably higher rotational velocity than the driven wheel 4 (as might occur, for example when the driven wheel 2 is on a patch of ice). In this case, the wheel velocity signal supplied to logic controller 54 is greater than the wheel velocity signal supplied by sensing means 52, whereupon pulse generator 56 is activated. Consequently, 12-volt pulses are supplied to the coil of solenoid means 40, and a 12-volt potential is applied to the coil of solenoid means 32. Auxiliary solenoid means 32 — which is of the "push" type — is thus energized to displace armature pin 34 to close the by-pass passage 30, thereby isolating the outlet port 24 from the inlet port 22. During the first cycle of energization of solenoid means 40, armature 38 is retracted to displace the pumping member 39 to the left, thereby drawing a portion of fluid from the master cylinder 8 into the pumping chamber 20 via the check valve 28. Upon de-energization of the main solenoid means 40, armature 38 and pumping member 39 are shifted to the right by the main spring 44 to pump a quantity of fluid from pumping chamber 20 to the wheel cylinder 10 via check valve 26 and outlet port 24. As solenoid means 40 continues to be energized and de-energized, respectively, fluid is pumped into the wheel cylinder 10 to effect braking of the overrunning driven wheel 2.

Normally, the armature 38 has a relatively long pumping stroke as the armature is reciprocated between its first and second end positions. In accordance with the present invention, as the back pressure of the wheel cylinder 10 builds up, the force of the main spring 44 is eventually overcome, whereupon the main spring 44 no longer has sufficient force to shift the armature 38 to the right toward its illustrated end position. The armature 38 thus remains in its left hand position with the O-ring 46 in compressed engagement with the abutment 42a defined by the end surface of the stator 42. Consequently, as the solenoid 40 is further energized and de-energized, respectively, by the pulse generator means 56, the armature 38 and the pumping member 39 are reciprocated with a relatively short stroke as permitted by the resiliency of the compressed O-ring 46. Thus, owing to this relatively short stroke operation of the pumping member 39, a further buildup in pressure of the wheel cylinder 10 is accomplished, thereby to further effect braking of the driven wheel 2. During this braking of the driven wheel 2, torque from the engine is transmitted to the other wheel 4 via the drive shaft 5 and the differential mechanism 6, whereupon the vehicle will propel itself from the icy condition which initially caused overrunning of the driven wheel 2. When the overrunning condition is reduced to the point that the two driven wheels have generally the same rotational velocity, as determined by the sensing means 50 and 52, respectively, the logic controller 54 operates to deactivate the pulse generator means 56, whereupon solenoids 32 and 40 are de-energized, thereby reopening the by-pass passage 30, and interrupting the reciprocatory movement of the pumping member 39. Pressure fluid may then be again simultaneously applied to both wheel cylinders from the master cylinder 8 via the de-actuated modulating pump means 14 and 16.

In the event that the driven wheel 4 should overrun the driven wheel 2 by a predetermined amount, pulse generator 58 is activated to operate the modulating pump means 16 to pump pressure fluid to wheel cylinder 12 in the same manner as described above, thereby effecting braking of the faster wheel 4. When this overrunning condition is eliminated, logic controller 54 effects deactivation of the pulse generator means 58.

It is important to note that the master cylinder 8 can always override the operation of the modulating pump means 16. More particularly, even though the auxiliary solenoid 32 is operated to close the associated by-pass passage 30, operation of the foot-operated brake lever 7 will cause pressure fluid to be supplied to the wheel cylinder 10 via inlet port 22, check valve 28, pumping chamber 20, check valve 26, and outlet port 24, and, in a similar fashion, to the wheel cylinder 12 via the modulating pump means 16.

In accordance with an important feature of the invention, the manual control means 70 may be operated to cause logic controller 54 to simultaneously operate pulse generator means 56 and 58, whereupon pressure fluid is simultaneously supplied to both of the wheel cylinders 10 and 12 to effect braking of both driven wheels 2 and 4. Consequently, the traction control system may also serve as an emergency braking system in the event that the primary braking system including the master cylinder 8 becomes inoperative.

Figure 4:
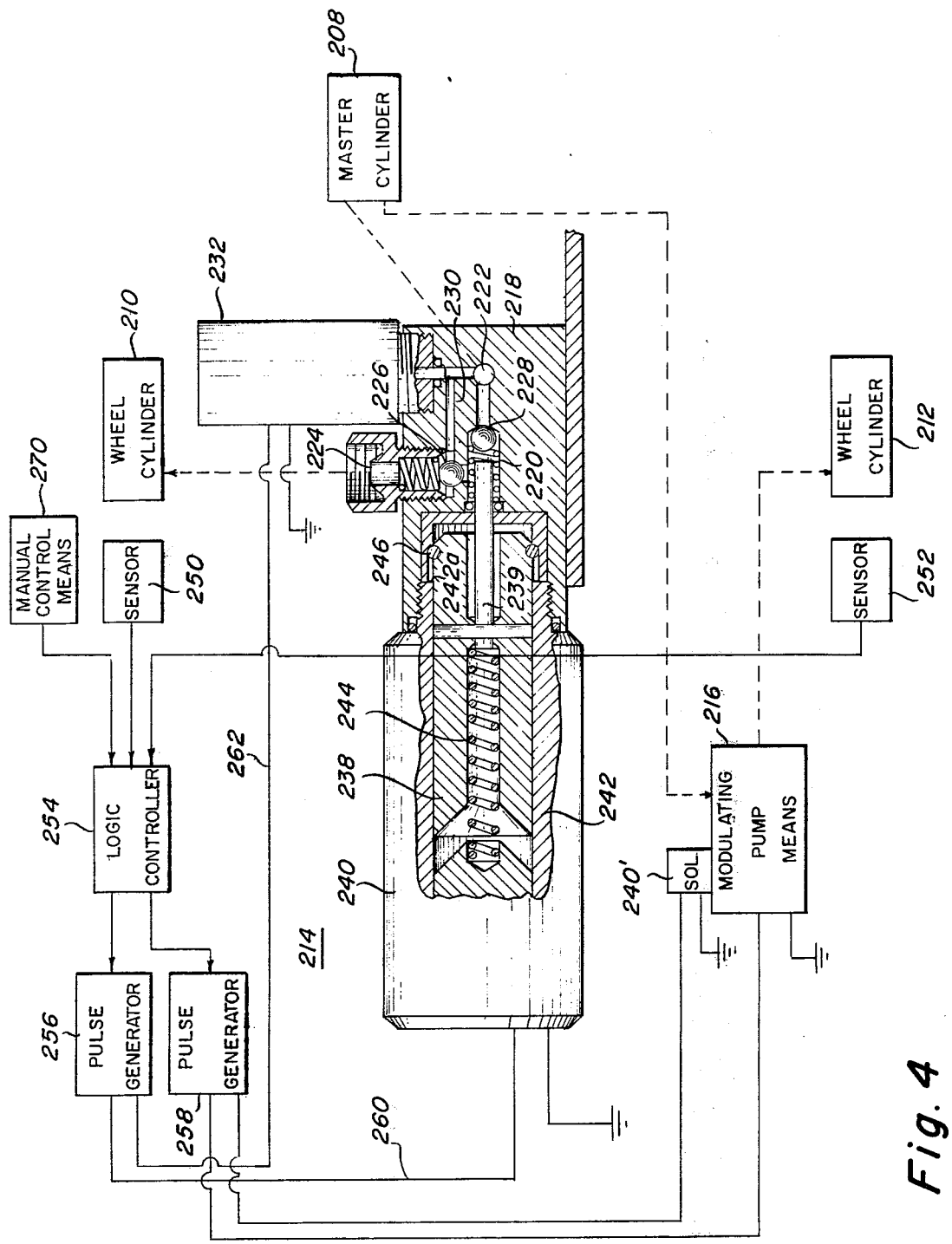
FIGS. 4-6 illustrate a second embodiment of the invention, FIG. 5 being a sectional elevational view of the valve body, and FIG. 6 being a sectional view taken along line 6—6 of FIG. 5.
Figure 5:
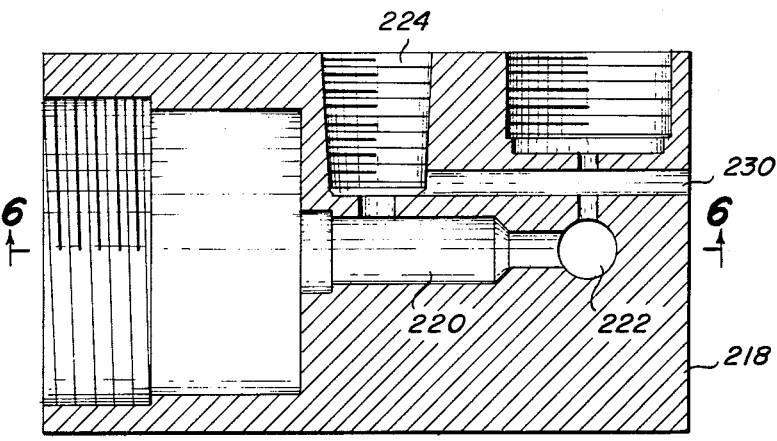
Figure 6:
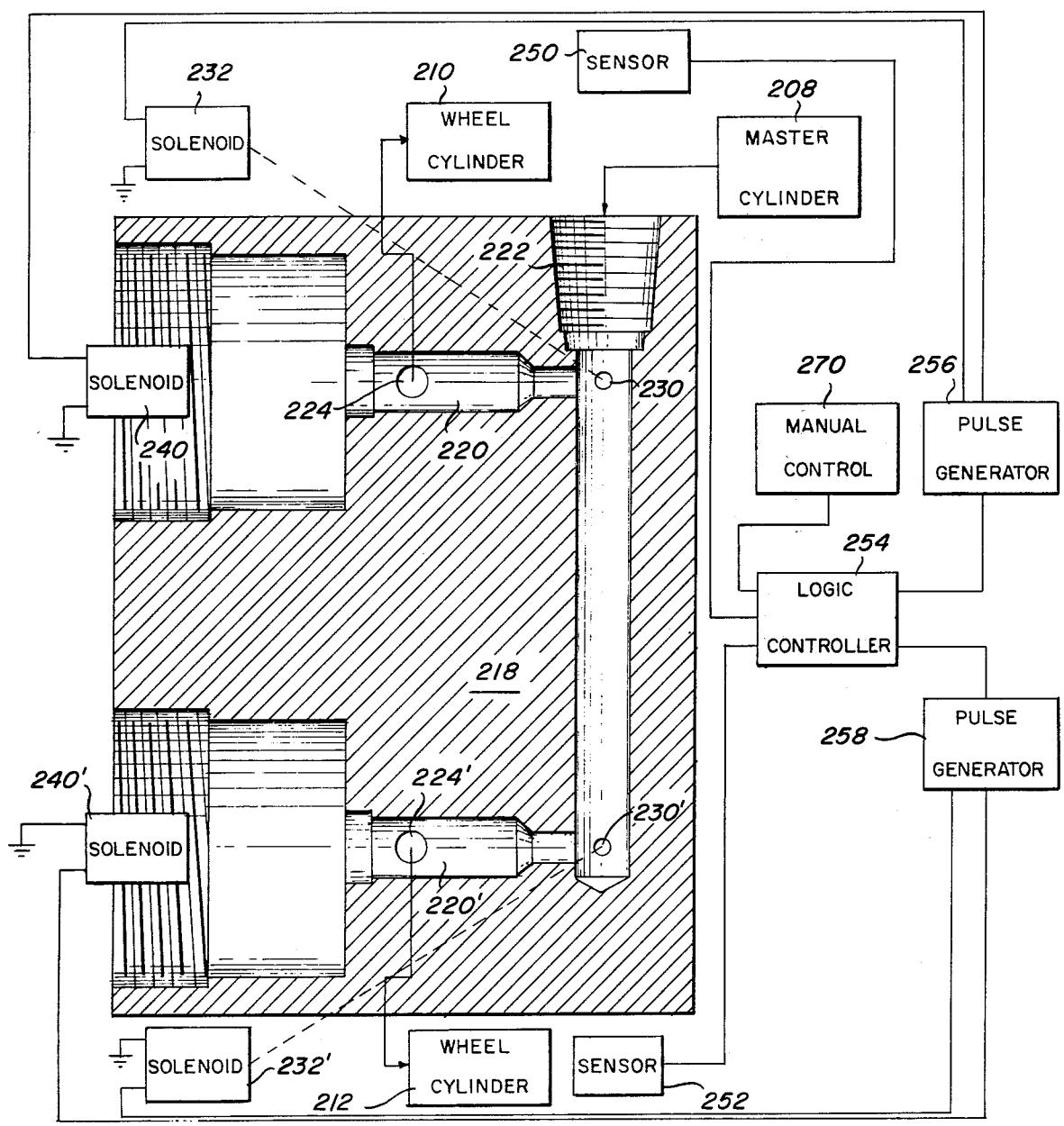

Referring now to the embodiment of FIGS. 4-6, a single valve body 218 is provided which contains a pair of pumping chambers 220 and 220' that communicate with a single inlet port 222 and also with outlet ports 224 and 224', respectively. By-pass passages 230 and 230' connect the inlet ports with the outlet ports 224 and 224', respectively, in by-passing relation to the associated pumping chambers as in the embodiment of FIG. 1. The remaining portion of the traction control system is identical in structure and operation to the system described with respect to FIGS. 1-3. Thus, wheel speed sensing means 250 and 252 are associated with the differential-connected driven wheels that are braked by the wheel cylinders 210 and 212, respectively. When one driven wheel overruns the other by a predetermined amount, logic controller 254 operates the pulse generator associated with the faster running wheel to operate the by-pass solenoid 232 to close the by-pass passage 230, and to apply pulses to the main solenoid 240 to effect reciprocation of the pumping member 239. Consequently, pressure fluid is then pumped to the wheel cylinder of the faster running wheel and thereby brake the same. When the overrunning condition is terminated, the logic controller 254 deactivates the pulse generator to de-energize the by-pass solenoid 232 and also to deactivate the main solenoid 240 to interrupt pumping operation.

It is important to note that each of the armatures 238 and 238' of the main solenoids 240 and 240' are provided with resilient abutment means 246 and 246', respectively. As shown in FIG. 4, when the armature 238 is shifted to the left against the counteracting force of the mainspring 244, O-ring 246 is compressed by the abutment 242a defined by the end of the stator 242. As in the embodiment of FIG. 1, the armature 238 and the pumping member 239 normally have a relatively long stroke, but when the back pressure appearing at the outlet 224 exceeds the force of the mainspring 244, the armature 238 is no longer shifted to the right of the illustrated position, but rather remains in the left hand position in which O-ring 246 is compressed by the energization and de-energization of the solenoid means 240 to reciprocate the pumping member 239 through a relatively short stroke, thereby to pump additional fluid to increase the fluid pressure at wheel cylinder 210. The operation of the associated modulating pump means 216 including the solenoid 240' is identical in structure and operation. As in the embodiment of FIG. 1, the manual control means 270 may be operated to effect simultaneous operation of both pulse generators 256 and 258, thereby to pump fluid to both wheel cylinders 210 and 212 to effect braking of both differential-connected driven wheels.

Figure 7:
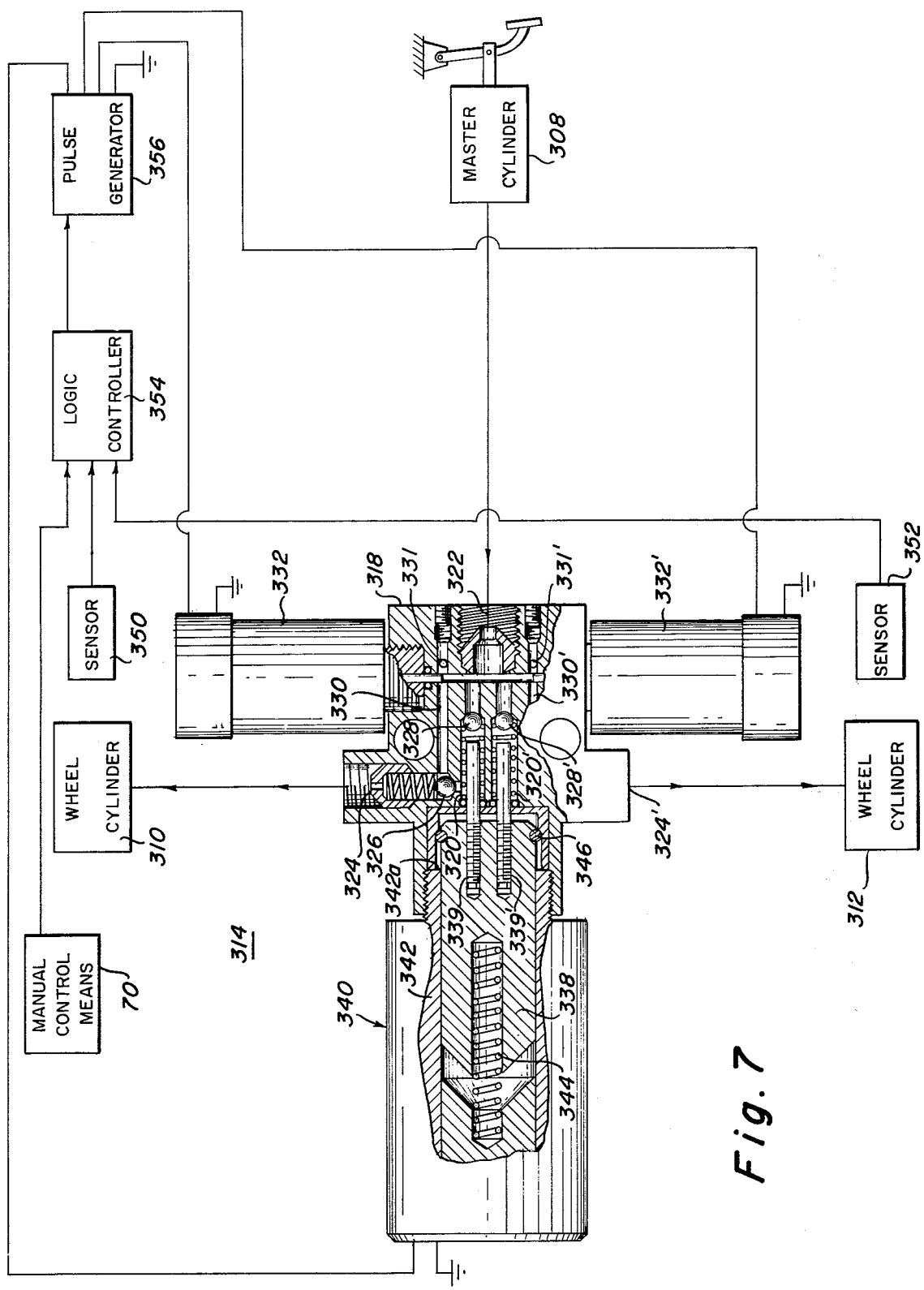
FIG. 7 is a partially diagrammatic electrical schematic illustration of a third embodiment of the invention.

Referring now to the embodiment of FIG. 7, a single valve body 318 is provided which contains a pair of pumping chambers 320 and 320' that communicate with a common inlet port 322. The pumping chambers also communicate with outlet ports 324 and 324' which are connected with the wheel cylinders 310 and 312, respectively. By-pass passages 330 and 330' connect the inlet port 322 with the outlet ports 324 and 324', respectively, in by-passing relation to the associated pumping chambers. Plugs 331 and 331' close the drilled openings of the by-pass passages, respectively. Auxiliary by-pass solenoid means 332 and 332' are operable to selectively close the by-pass passages 330 and 330', respectively.

In this embodiment, only a single main solenoid means 340 is provided, said solenoid means including a stator 342 and an armature 338 that is connected with the ends of a pair of pumping members 339 and 339' that extend at one end within the pumping members 320 and 320', respectively. In this embodiment, the logic controller 354 controls the operation of only a single pulse generator 356 that supplies 12 volt pulses to the solenoid means 340, and which also selectively operates by-pass solenoids 332 and 332' associated with the pumping chambers 320 and 320', respectively.

In this embodiment, in the event that the driven wheel associated with wheel cylinder 310 overruns by a predetermined amount the driven wheel associated with wheel cylinder 312 (which driven wheels are connected by a conventional differential mechanism), sensor means 350 provide a signal to the logic controller 354 which will actuate the pulse generator 356 and will also energize the by-pass solenoid 332. Consequently, by-pass passage 330 is closed, and 12 volt pulses are supplied to the main solenoid 340 to effect reciprocation of the two pumping members 339 and 339'. Since by-pass passage 330 is closed fluid will be pumped by the pumping member 339 to wheel cylinder 310 via check valve 326 and outlet port 324. Consequently, the faster driven wheel will be braked, and torque will be delivered to the other wheel to propel the vehicle from the road condition effecting the overrunning condition. As in the prior embodiments, the O-ring 346 is mounted in a peripheral groove on the free extremity of the armature 338 for engagement with the abutment surface 342a of the stator 342 when the back pressure at outlet port 324 exceeds the effective force of the mainspring 344, whereby the pumping member 339 is operated in the short-stroke condition. When the overrunning condition of the driven wheel is terminated, the logic controller 354 de-activates the pulse generator 356 and de-energizes the by-pass solenoid 332, whereupon the by-pass passage 330 is opened and the modulator means is deactivated.

Figure 8:
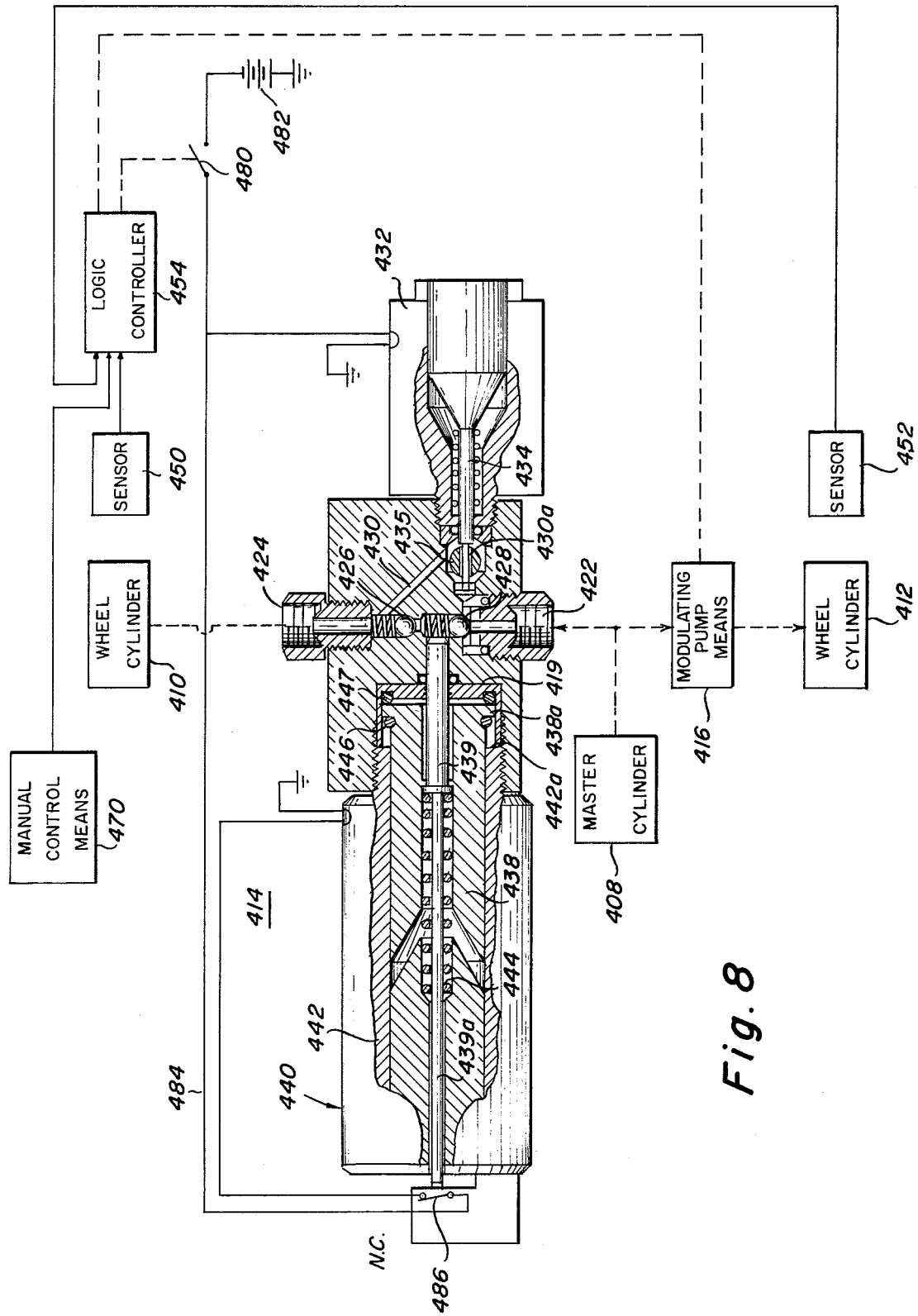
FIG. 8 is a partially diagrammatic electrical schematic illustration of a self-commutating modulating pump.

Referring now to the self-commutating embodiment of FIG. 8, it will be noted that the pulse generator means of the previous embodiments is omitted, and the logic controller 454 is operable to close switch means 480 to connect the coil of by-pass solenoid 432 directly with the 12 volt power source 482. Similarly, the coil of the main solenoid 440 is connected in parallel with the coil of by-pass solenoid 432 by conductor means 484 containing the normally closed switch 486. Furthermore, in this embodiment, the O-ring 446 is arranged adjacent the external flange portion 438a of the armature 438 for compression by the stationary abutment surface 442a defined by the stator 442. A further O-ring 447 is mounted within the insert sleeve 419 of the valve body 418 for engagement by the end extremity of armature 438 when it is in its illustrated right-hand position. Furthermore, in this embodiment, the by-pass passage control means includes a ball valve 435 that is loosely mounted concentrically upon the protruding pin portion of the armature extension 434 of the by-pass solenoid 432. Thus, the diameter of the through bore of the ball valve 435 is slightly greater than the corresponding diameter of the pin portion of extension 434 upon which it is mounted, thereby to define a bleed passage 430a.

In operation, in the event that the driven wheel associated with wheel cylinder 410 overruns the other driven wheel that is connected thereto by the differential mechanism, the sensor means 450 provides an input signal to logic control means 454 which will close switch 480 to energize the coils of solenoids 432 and 440. The armature of solenoid 432 is then shifted to the left to cause by-pass passage 430 to be closed by the ball valve 435, and armature 438 is shifted to the left to retract pumping member 439 relative to the pumping chamber 420. When the armature 438 reaches its left-hand position, the extension 439a will open the movable contact of switch 486, thereby de-energizing the main solenoid 440. Return spring 444 then shifts the armature 438 to the right toward its right-hand position, thereby pumping fluid to wheel cylinder 410 via check valve 426 and outlet 424. The normally closed switch 486 then closes to again energize solenoid means 440, whereupon the armature 438 is again shifted to the left. This reciprocation of the armature 438 continues until the back pressure at outlet 424 overcomes the effective force of return spring 444, whereupon the armature 438 remains in its left-hand position, and the pumping operation is terminated. When the overrunning condition is terminated, the logic controller 454 causes de-activation of both of the modulating pump means 414 and 416. As in the prior embodiments, manual control means 470 are provided for effecting simultaneous operation of both modulating pump means 414 and 416, thereby to pump pressure fluid to both wheel cylinders 410 and 412 to brake both of the driven wheels.

In each of the illustrated embodiments, the O-ring associated with the pumping member is mounted in a groove on the free extremity of the armature means of the solenoid for compression by stationary abutment means when the return force of the main spring is overcome by the back pressure of the fluid at the associated outlet port. Of course, the location of this O-ring could be changed as desired. For example, as shown in FIG. 9, the O-ring 546 may be contained in a groove in the stationary stator member 538 for compression by the flange portion 538a at the free extremity of the armature 538. Thus, the full-stroke and short-stroke pumping operations may be achieved in the embodiment of FIG. 9 as disclosed above in connection with the other embodiments.

Although the modulating pump means of the present invention have been disclosed in connection with a traction control system of the anti-slip type, it is apparent that the modulating pump means could also be included in a traction control system of the anti-skid type. Furthermore, the pumping means of the present invention are suitable for use in many other hydraulic applications. It is apparent that by modifying the restoring force of main spring 44, the resiliency of the O-ring abutment means 46 and/or the timing cycle produced by timing means 80, the pumping pressure of the modulating pump means may be varied, as desired. Furthermore, in the embodiment of FIG. 8, the pumping operation may be controlled by varying the location of switch 486 relative to the stator 442.

While in accordance with the provision of the Patent Statutes the preferred form and embodiments of the invention have been illustrated and described, it will be apparent to those skilled in the art that other changes and modifications may be made without deviating from the inventive concepts set forth above.

What is claimed is:

1. Solenoid-operated modulator means for modulating the brake pressure of a motor vehicle having a master cylinder, and a plurality of wheel brake cylinders associated with the wheels, respectively, of the vehicle, comprising
   a. a valve body containing a pumping chamber and including inlet and first outlet ports communicating with said pumping chamber, said inlet and first outlet ports being adapted for communication with said master cylinder and with one of said wheel cylinders, respectively, said valve body also including a normally open first by-pass passage directly connecting said inlet and first outlet ports to by-pass said pumping chamber;
   b. first check valve means normally isolating said first outlet port from said pumping chamber, and second check valve means normally isolating said pumping chamber from said inlet port;
   c. a reciprocatory pumping member extending at one end through a bore contained in said valve body and terminating in said pumping chamber;

d. main solenoid means alternately operable between energized and de-energized conditions for reciprocating said pumping member, said main solenoid means including
   1. a stator rigidly connected with said valve body;
   2. a linearly movable armature connected with the other end of said pumping member for linear displacement relative to said stator between first and second end positions, thereby to effect relatively large stroke pumping operation;
   3. main spring means biasing said armature toward one of said end positions; and
   4. resilient abutment means arranged for compression by said armature when said armature is in its other end position, thereby to increase the pumping pressure produced by said pumpig member with relatively small stroke operation of the armature when the pressure of said main spring means is overcome by the fluid back pressure appearing at the outlet port;
e. first by-pass control means for closing said first by-pass passage; and
f. means for alternately energizing and de-energizing said solenoid means, thereby to reciprocate said pumping member, whereby when said by-pass is in the closed condition, fluid is pumped from said inlet port to said first outlet port.

2. Apparatus as defined in claim 1, wherein said means for closing said first by-pass passage means comprises a first by-pass control valve, and first by-pass solenoid means for controlling the operation of said first by-pass control valve between open and closed conditions, respectively.

3. Apparatus as defined in claim 1, wherein said valve body includes a second pumping chamber in communication with said inlet port, said valve body including a second outlet port communicating with said second pumping chamber and adapted for connection with a second wheel cylinder of the vehicle, and a normally open second by-pass passage affording communication between said inlet port and said second outlet port, thereby by-passing said second pumping chamber; and further including
   g. third check valve means normally isolating said second outlet port from said pumping chamber, and fourth check valve means normally isolating said second pumping chamber from said inlet port;
   h. a second reciprocatory pumping member extending at one end through a bore contained in said valve body and terminating in said second pumping chamber;
   i. second main solenoid means alternately operable between energized and de-energized conditions for reciprocating said second pumping member, said second main solenoid means including
      1. a second stator rigidly connected with said valve body;
      2. a linearly movable second armature connected with the other end of said second pumping member for linear displacement relative to said stator between first and second end positions;
      3. second main spring means biasing said armature toward one of said end positions; and
      4. second resilient abutment means arranged for compression by said armature when said second armature is in its other end position, thereby to increase the pumpinng pressure produced by said second pumping member when the force of said second main spring means is overcome by the back pressure of the fluid at said second outlet port;
   j. second by-pass control means for closing said second by-pass passage; and
   k. means operable when said second by-pass passage is closed for alternately energizing and de-energizing said second solenoid means, thereby to reciprocate said second pumping member and pump fluid from said inlet port to said outlet port.

4. Apparatus as defined in claim 3, and further including
   l. wheel speed sensing means for sensing the rotational velocities of the wheels associated with the wheel cylinders of the vehicle that are connected with said first and second outlet ports, respectively; and
   m. speed-responsive means operable when the rotational velocities of the wheels deviate from a predetermined value for selectively operating to the closed condition at least one of said first and second by-pass control means and for operating the main solenoid means associated therewith, thereby to effect braking of the associated wheel.

5. Apparatus as defined in claim 4, wherein the wheels associated with said pair of wheel cylinders are driven wheels connected by a differential mechanism; and further wherein said speed-responsive means is operable when the rotational velocity of one wheel exceeds that of the other wheel by a predetermined value to operate only the by-pass control means and the main solenoid valve means associated with the faster wheel, thereby to effect braking of the faster wheel.

6. Apparatus as defined in claim 1, wherein said valve body contains a second pumping chamber communicating with said inlet port, a second outlet port communicating with said second pumping chamber and adapted for connection with a second wheel cylinder of the vehicle, and a normally open second by-pass passage connecting said inlet port with said second outlet port to by-pass said second pumping chamber; and further including
   g. third check valve means normally isolating said second outlet port from said second pumping chamber, and fourth check valve means normally isolating said second pumping chamber from said inlet port;
   h. a second reciprocatory pumping member extending at one end through a bore contained in said valve body and terminating in said second pumping chamber, said second pumping member being connected with said main solenoid means for simultaneous reciprocatory movement with the other pumping member; and
   i. means for closing said second by-pass passage, whereby when at least one of said by-pass passages is closed and said main solenoid means is operated to reciprocate said pumping members, fluid is pumped to the outlet port associated with the by-pass passage which is in the closed condition.

7. Apparatus as defined in claim 6, and further including
   j. wheel speed sensing means for sensing the rotational velocities of the wheels associated with those wheel cylinders of the vehicle that are connected with the outlet ports of said valve body, respectively; and k. speed-responsive means operable when the rotational velocities of the wheels deviate from a predetermined value for selectively operating to the closed condition the by-pass control means of at least one of said modulator means and for operating said main solenoid means, thereby to pump fluid to the associated wheel cylinder to effect braking of the associated wheel.

8. Apparatus as defined in claim 7, wherein the wheel associated with said pair of wheel cylinders are driven wheels connected by a differential mechanism; and further wherein said speed-responsive means is operable when the rotational velocity of one wheel exceeds that of the other wheel by a predetermined value to operate only the by-pass control means and the main solenoid valve means associated with the faster wheel, thereby to effect braking of the faster wheel.

9. Apparatus as defined in claim 7, and further including
   l. manual control means connected with said speed-responsive means for simultaneously closing both by-pass passages and for operating said main solenoid means to pump pressure fluid to both said wheel cylinders.

10. Apparatus as defined in claim 1, and further including a second solenoid-operated modulator means the inlet port of which is connected with the master cylinder and the outlet port of which is connected with another wheel cylinder of the vehicle, said second modulator means including first and second check valve means, a reciprocatory pumping member, main solenoid means for reciprocating said pumping member, resilient abutment means, means for opening and closing the by-pass passage of said second modulating means, and means for energizing and de-energizing said solenoid means; and further including
   g. wheel speed sensing means for sensing the rotational velocities of the wheels associated with those wheel cylinders of the vehicle that are connected with the outlet ports of said pair of modulator means, respectively; and
   h. speed-responsive means operable when the rotational velocities of the wheels deviate from a predetermined value for selectively operating to the closed condition the by-pass control means of at least one of said modulator means and for operating the main solenoid means associated therewith, therby to pump fluid to the associated wheel cylinder to effect braking of the associated wheel.

11. Apparatus as defined in claim 10, wherein the wheel associated with said pair of wheel cylinders are driven wheels connected by a differential mechanism; and further wherein said speed-responsive means is operable when the rotational velocity of one wheel exceeds that of the other wheel by a predetermined value to operate only the by-pass control means and the main solenoid valve means associated with the faster wheel, thereby to effect braking of the faster wheel.

12. Apparatus as defined in claim 10, and further including
   i. manual control means connected with said speed-responsive means for simultaneously closing both by-pass passages and for operating said main solenoid means to pump pressure fluid to both said wheel cylinders.

13. Apparatus as defined in claim 1, and further including a second one of said modulating means, said second modulating means including an inlet port connected with said master cylinder, and an outlet port connected with a second wheel cylinder of the vehicle, said second modulator means also including first and second check valve means, a reciprocatory pumping member, main solenoid means for reciprocating said pumping member, resilient abutment means, means for opening and closing the by-pass passage of said second modulating means, and means for energizing and de-energizing said solenoid means; and further including
   g. wheel speed sensing means for sensing the rotational velocities of the wheels associated with those wheel cylinders of the vehicle that are connected with the outlet ports of said pair of modulator means, respectively; and
   h. speed-responsive means operable when the rotational velocities of the wheels deviate from a predetermined value for selectively operating to the closed condition the by-pass control means of at least one of said modulator means and for operating the main solenoid means associated therewith, thereby to pump fluid to the associated wheel cylinder to effect braking of the associated wheel.

14. Apparatus as defined in claim 13, wherein the wheels associated with said pair of wheel cylinders are driven wheels connected by a differential mechanism; and further wherein said speed-responsive means is operable when the rotational velocity of one wheel exceeds that of the other wheel by a predetermined value to operate only the by-pass control means and the main solenoid valve means associated with the faster wheel, thereby to effect braking of the faster wheel.

15. Apparatus as defined in claim 14, and further including
   i. manual control means connected with said speed-responsive means for simultaneously closing both by-pass passages and for operating said main solenoid means to pump pressure fluid to both said wheel cylinders.

16. Apparatus as defined in claim 13, and further including
   i. manual control means connected with said speed-responsive means for simultaneously closing both by-pass passages and for operating said main solenoid means to pump pressure fluid to both said wheel cylinders.

17. Apparatus as defined in claim 1, wherein said resilient abutment means comprises resilient O-ring means mounted on said armature for engagement with a corresponding stationary shoulder on said stator.

18. Apparatus as defined in claim 17, wherein said O-ring means comprises an O-ring mounted in an external groove contained in the outer periphery of said armature, said O-ring being concentrically arranged about said armature.

19. Apparatus as defined in claim 18, and further including stationary abutment means supported by said valve body for engagement by said O-ring when said armature is in said one end position.

20. Apparatus as defined in claim 17, wherein said armature includes at one end adjacent said valve body a peripheral flange portion; and further wherein said O-ring means comprises an O-ring mounted concentrically on said armature adjacent said flange portion and between said flange portion and the adjacent end of said stator.

21. Apparatus as defined in claim 20, and further including second O-ring means mounted on said valve body for engagement by said armature when said armature is in said one end position.

22. Apparatus as defined in claim 1, wherein said resilient abutment means are mounted on one of said stator and valve body means for compression by the said armature.

23. Solenoid-operated modulator means for modulating the brake pressure of a motor vehicle having a master cylinder, and a plurality of wheel brake cylinders associated with the wheels, respectively, of the vehicle, comprising
   a. a valve body containing a pumping chamber and including inlet and outlet ports communicating with said pumping chamber, said inlet and outlet ports being adapted for communication with said master cylinder and with one of said wheel cylinders, respectively, said valve body also including a normally open by-pass passage directly connecting said inlet and outlet ports to by-pass said pumping chamber;
   b. first check valve means normally isolating said outlet port from said pumping chamber, and second check valve means normally isolating said pumping chamber from said inlet port;
   c. a reciprocatory pumping member extending at one end through a bore contained in said valve body and terminating in said pumping chamber;
   d. main solenoid means alternately operable between energized and de-energized conditions for reciprocating said pumping member, said main solenoid means including
      1. a stator rigidly connected with said valve body;
      2. a linearly movable armature connected with the other end of said pumping member for linear displacement relative to said stator between first and second end positions, thereby to effect relatively large stroke pumping operation; and
      3. main spring means biasing said armature toward one of said end positions;
   e. by-pass control means for closing said by-pass passage; and
   f. means for alternately energizing and de-energizing said main solenoid means, thereby to reciprocate said pumping member, whereby when said by-pass passage is in the closed condition, fluid is pumped from said inlet port to said outlet port, said energizing and de-energizing means comprising
      1. means for normally energizing said main solenoid means; and
      2. switch means for de-energizing said main solenoid means when said armature is in said other end position.

24. Apparatus as defined in claim 23, and further wherein said means for opening and closing said by-pass passage includes bleed passage means for bleeding fluid from said outlet port to said inlet port when said by-pass passage is in the closed condition.

25. Apparatus as defined in claim 23, wherein said means for closing said by-pass passage comprises a normally open by-pass control valve, and by-pass solenoid means for closing said by-pass control valve, said by-pass solenoid means including a stator connected with said valve body, an armature mounted for reciprocation relative to said stator, said armature having a pin extension directed toward a valve seat arranged in said by-pass passage, and a ball valve containing a through bore mounted on said pin extension, said through bore having a greater diameter than the external diameter of said pin extension, thereby to define an annular space which comprises said bleed passage means.

26. In a vehicle braking system including a plurality of wheels having wheel brake cylinders, respectively, and master cylinder means for supplying fluid simultaneously to said wheel cylinders for braking the vehicle; the improvement which comprises
   a. at least two normally de-activated pumping means connected between said master cylinder and at least two of said wheel cylinders, respectively, each of said pumping means including
      1. a valve body containing a pumping chamber communicating both with an inlet port connected with said master cylinder and an outlet port connected with one of the wheel cylinders, said valve body also including a normally open by-pass passage connected between said inlet and outlet ports to by-pass the pumping chamber;
      2. first check valve means normally isolating said outlet port from said pumping chamber, and second check valve means normally isolating said pumping chamber from said inlet port;
      3. a reciprocatory pumping member extending at one end in said pumping chamber;
      4. main solenoid means for reciprocating said pumping member, said main solenoid means including
         a. a stator connected with the valve body;
         b. a movable armature connected with the other end of said pumping member for linear movement between first and second end positions relative to said stator; and
         c. main spring means biasing said armature toward one of said end positions;
      5. by-pass control means for closing said by-pass passage; and
      6. means for alternately energizing and de-energizing said solenoid means, thereby to reciprocate said pumping member, whereby when said by-pass passage is in the closed condition, fluid is pumped from said inlet port to said outlet port;
   b. wheel speed sensing means associated with at least the said two wheel cylinders; and
   c. speed-responsive means operable when the rotational velocity of at least one of the wheels deviates from a given value for selectively operating to the closed condition by the by-pass control means of at least one of said pumping means and for operating the main solenoid means associated therewith, thereby to pump fluid to the associated wheel cylinder to effect braking of the associated wheel.

27. Apparatus as defined in claim 26, wherein said pumping means further includes resilient abutment means mounted on one of said stator and valve body member for compression by said armature when in the said other position.

28. Apparatus as defined in claim 26, wherein said two wheel cylinders are associated with a pair of driven wheels of the vehicle that are connected by a differential mechanism; and further wherein said speed-responsive means is operable when the speed of one driven wheel exceeds that of the other by a predetermined amount for closing the by-pass passage and for energizing the main solenoid means associated with the faster driven wheel, thereby to pump fluid to the wheel cylinder of the faster wheel to brake the same.

29. Apparatus as defined in claim 28, wherein each of said pumping means includes a separate valve body.

30. Apparatus as defined in claim 28, wherein said pair of pumping means include a common valve body having a pair of pumping chambers which communicate with a common inlet port and with a pair of outlet ports, respectively, each of said pumping means including separate meain solenoid means and separate by-pass control means.

31. Apparatus as defined in claim 28, wherein said pair of pumping means include a common valve body having a pair of pumping chambers which communicate with a pair of outlet ports, respectively, said pair of pumping means including a common main solenoid means, and separate by-pass control means.

32. Apparatus as defined in claim 28, wherein the means for energizing and de-energizing the main solenoid means of each of said pumping means includes means including a power source for normally energizing said main solenoid means, and switch means operable when said armature is in the other of its end positions for disconnecting said power source from said main solenoid means.

33. Apparatus as defined in claim 28, wherein the by-pass control means of each of said pumping means including bleed passage means operable when the by-pass control means is in the closed condition for bleeding back to said inlet port a portion of the fluid at said outlet port.

34. Apparatus as defined in claim 26, and further including manual control means for simultaneously operating all of said pumping means.

* * * * *